[19] United States Patent
Schroeder, Jr.

[11] Patent Number: 4,732,297
[45] Date of Patent: Mar. 22, 1988

[54] LIQUID LEVEL DETECTOR APPARATUS FOR A CONCENTRATE DISPENSER TANK

[75] Inventor: Alfred A. Schroeder, Jr., San Antonio, Tex.

[73] Assignee: Lancer Corporation, San Antonio, Tex.

[21] Appl. No.: 778,271

[22] Filed: Sep. 12, 1985

Related U.S. Application Data

[63] Continuation of Ser. No. 545,655, Oct. 26, 1983, abandoned.

[51] Int. Cl.⁴ ................................................. B67D 5/08
[52] U.S. Cl. ...................................... 222/64; 73/304 C
[58] Field of Search .......................... 222/23, 65, 64, 66, 222/325, 467; 73/304 C, 304 R; 137/392; 340/620, 618; 324/65 R

[56] References Cited

U.S. PATENT DOCUMENTS

| 258,526 | 5/1882 | Zimmer | 222/467 |
|---|---|---|---|
| 3,060,835 | 10/1962 | Eads et al. | 340/620 X |
| 3,547,145 | 12/1970 | Holzer | 73/304 R |
| 3,894,240 | 7/1975 | Rose | 340/620 X |
| 3,916,926 | 11/1975 | Smolin et al. | 137/392 X |
| 4,002,996 | 1/1977 | Klebanoff et al. | 73/304 C X |
| 4,004,739 | 1/1977 | Cramer | 222/66 X |
| 4,083,038 | 4/1978 | Klebanoff | 340/620 |
| 4,099,167 | 7/1978 | Pomerantz et al. | 73/304 C X |
| 4,145,927 | 3/1979 | Larson | 73/304 C X |
| 4,165,641 | 8/1979 | Pomerantz et al. | 73/304 C X |
| 4,214,237 | 7/1980 | Zissimopoulos | 222/325 X |
| 4,285,351 | 8/1981 | Nyffenegger | 133/1 R |
| 4,295,370 | 10/1981 | Bristol | 73/304 C X |
| 4,547,768 | 10/1985 | Kulhavy | 340/620 |

FOREIGN PATENT DOCUMENTS 972049 7/1975 Canada ............................ 340/620

Primary Examiner—Joseph J. Rolla
Assistant Examiner—Edward S. Ammeen
Attorney, Agent, or Firm—Cox & Smith Inc.

[57] ABSTRACT

A liquid concentrate dispensing apparatus having a removable and refillable concentrate tank with sensors connected therewith flush with the inside wall of the tank to facilitate cleaning. The sensors comprise detectors which include an electrically conductive housing, one wall of the housing is substantially flush with the inside wall of the tank. Spring biased detent members on the outside of the tank releasably connect the detectors with the dispensing apparatus when the tank is inserted to a preselected position. The tank is provided with two such sensors, one is located in the sidewall and the other is located in the bottom wall. When the tank is inserted into the dispensing apparatus, the spring biased detent members engage contacts on the apparatus. A current passes between the detectors on the sidewall and bottom wall when both are covered by liquid concentrate. When concentrate no longer covers the detector in the sidewall, the current doesn't pass, thus indicating that concentrate needs to be added to the tank.

10 Claims, 6 Drawing Figures

LIQUID LEVEL DETECTOR APPARATUS FOR A CONCENTRATE DISPENSER TANK

This application is a continuation of application Ser. No. 545,655, filed on Oct. 26, 1983, and now abandoned.

BACKGROUND OF THE INVENTION

This invention relates generally to an apparatus for determining when a concentrate tank for the liquid dispensing apparatus is in position and when the liquid level in a tank reaches a predetermined level and, more particularly, to a sensor means flush with the inside wall of the tank to facilitate cleaning and having an engaging means to connect the sensor means with a concentrate dispensing apparatus for detecting when the liquid level reaches a predetermined level and when the tank is in position for dispensing.

It is well known in the art to provide a liquid containing tank with measurement means for determining the liquid level therein. It is common to position such measurement means within the tank to directly contact the liquid in order to determine the level thereof.

It is also known that in certain applications it is desirable to position the liquid level measurement means so that it does not contact any liquid inside the tank or require holes to be placed in the tank. Obstructions or metallic objects inside of a tank may become entangled or covered with solid or semi-solid materials which can cause a malfunction of the level detecting device and prevent the tank from being easily emptied and cleaned. This also may lead to cleaning problems in the case of concentrate tanks for drink dispensers.

Known U.S. patents relating to liquid level sensing are U.S. Pat. No. 3,547,145 issued to Holzer, U.S. Pat. No. 3,916,926 issued to Smolin et al, U.S. Pat. No. 4,099,167 issued to Pomerantz et al, U.S. Pat. No. 4,145,927 issued to Larson, U.S. Pat. No. 4,165,641 issued to Pomerantz et al and U.S. Pat. No. 4,295,370 issued to Bristol.

In the cases of certain fruit juice concentrate drink dispensers, liquid level sensors may be very difficult to clean. A coating may be formed on the inside of the tank and on a level detector means contacting the drink concentrate in the tank.

It is an object of the present invention to provide a liquid level detector means mounted within the tank which is easy to clean to maintain sanitary conditions in the tank. It is a further object of the invention to provide a liquid level detector which is not readily fouled and which will continue to provide an indication of when the level in the tank approaches a predetermined level and when the tank is in position for dispensing. Other objects of the invention will become apparent from the following detailed description.

SUMMARY OF THE INVENTION

According to the present invention there is provided a liquid concentrate dispensing apparatus having a dispensing means for dispensing liquid concentrate from a removable and refillable concentrate tank. The tank has a sensor means connected therewith including a detector means on the tank flush with the inside wall of the tank to facilitate cleaning. The detector means has an engaging means on the outside of the tank to releasably connect the detector means with the dispensing apparatus when the tank is inserted to a preselected position. The engaging means may include a spring biased detent means to releasably engage the dispensing apparatus.

BRIEF DESCRIPTION OF THE PREFERRED EMBODIMENT

Figure 1:
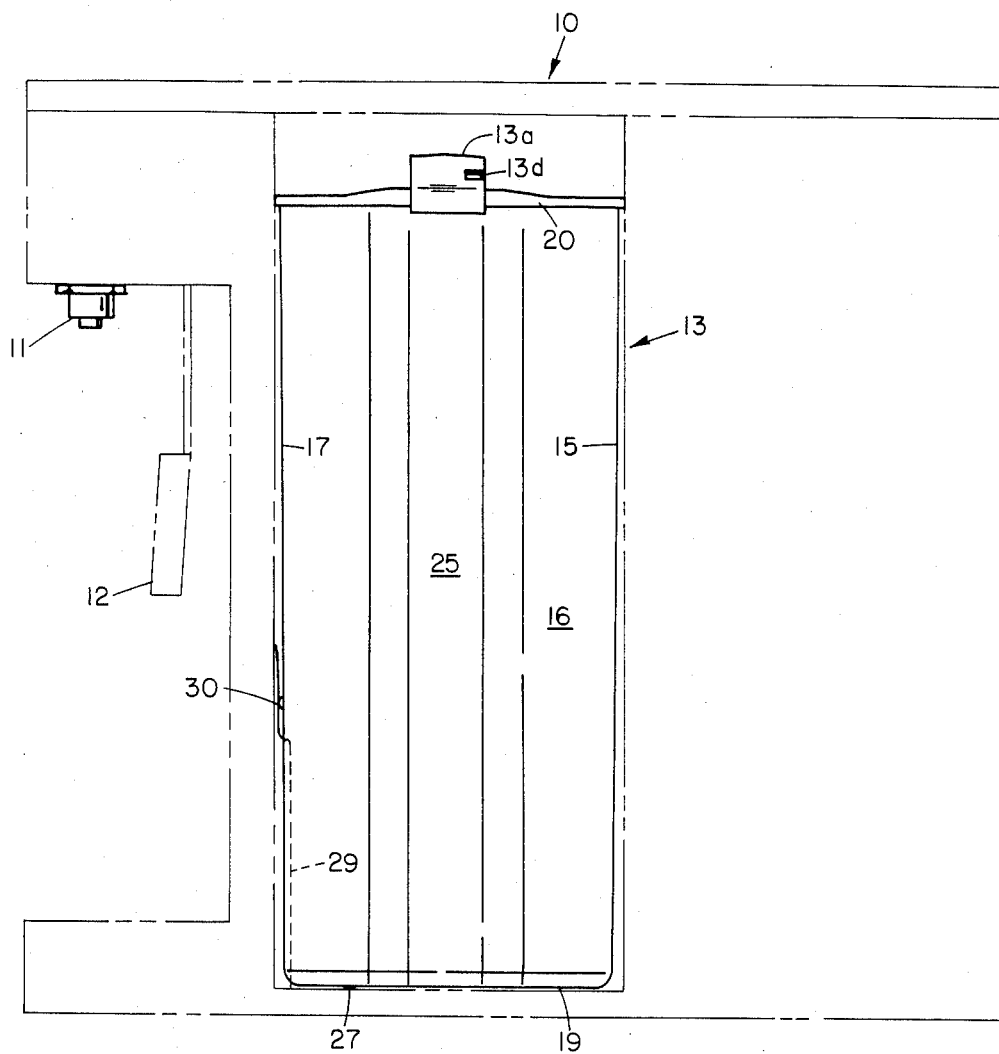
FIG. 1 is a side elevation view of the liquid concentrate dispensing apparatus with portions of the apparatus removed to reveal the concentrate tank.

Referring to FIG. 1 of the invention there is shown a liquid concentrate dispensing apparatus 10. Such devices are commonly used in restaurants and other commercial establishments for dispensing soft drinks. Because of transportation costs in shipping finished products, it is common to use concentrates which are mixed with water to make a finished product. Carbonation may or may not be added depending upon the product. Such dispensing apparatus commonly include a dispensing nozzle 11 which is activated by a lever 12. Such dispensing apparatus are generally well known in the art. Suitable refrigeration and mixing means may be provided for dispensing drinks.

The apparatus 10 includes a concentrate tank 13 which is inserted in an opening in the apparatus. Typically the cover (not pictured) may be removable which allows lifting of the concentrate tank out of the apparatus for cleaning and the like.

Figure 5:
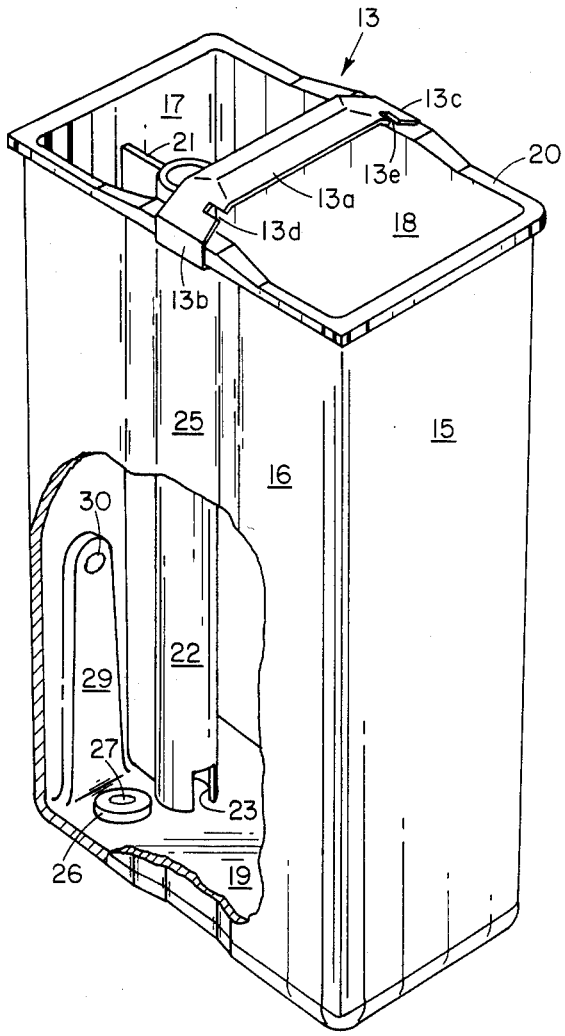
FIG. 5 is a perspective view with a portion of the tank broken away to show the detector means.

The tank 13 includes sidewalls 15, 16, 17 and 18 and a bottom wall 19. The upper end of the tank is open and includes a rim or flange member 20 around the periphery thereof. The tank 13 is typically constructed of a plastic material which is non-toxic and which is nonreactive to the concentrate which it is filled with. The sidewalls of the tank are flexible which allows, as shown in FIG. 5, attaching of metal handle 13a by portions 13b and 13c which underlie flange 20. Notches 13d and 13e receive the edge of a container for filling the tank with concentrate. The container is positioned with its edge in the slots while it rests on flange 20 for pouring into the tank. The handle 13a can be removed by flexing the walls 16 and 18 inwardly so that the flange 20 is removed from portions 13b and 13c.

Figure 4:
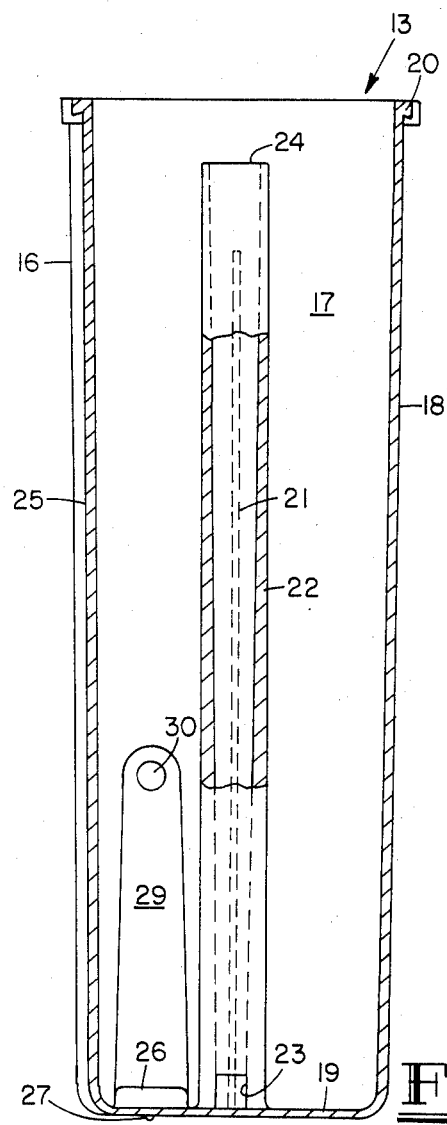
FIG. 4 is a cross-sectional side view of the tank.

As is best shown in FIG. 4, attached to the inside surface of sidewall 17 by a rib 21 is a dispensing tube 22. The dispensing tube 22 includes a slot or opening 23 through which concentrate is drawn. When the tank 13 is positioned in the dispensing apparatus, a connector means is attached to the upper end 24 of the dispensing tube for drawing concentrate through the slot 23 and upwardly through the tube to be dispensed through the dispensing apparatus.

The sidewalls 15 and 18 are generally flat. As shown in FIG. 5, the sidewall 16 includes a recessed portion 25 extending vertically throughout the length thereof to require correct positioning of the tank 13 within the dispensing apparatus. A mating protrusion (not shown) within the receiving opening of the dispensing apparatus mates with the recessed portion 25 so that the tank can only be inserted when it is properly oriented. A cylindrical boss 26 is formed integral with the bottom wall 19 and receives a detector means 27 which extends through an opening through the bottom of the tank and the cylindrical boss 26 until it is flush with the top surface of cylindrical boss 26.

Figure 6:
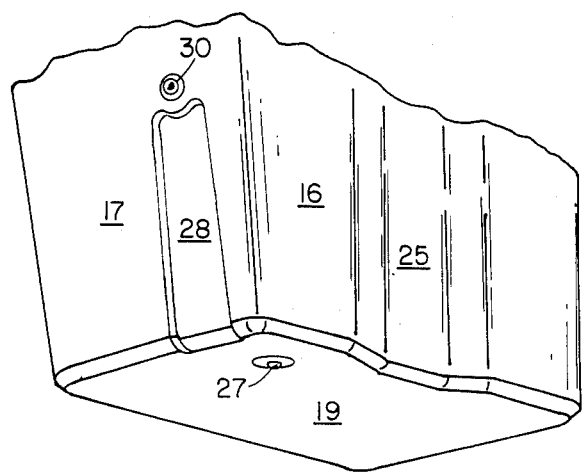
FIG. 6 is a partial view of the lower portion of the concentrate tank showing the detector means.

As shown in FIGS. 4 and 6, a recessed portion 28 is formed in the outside surface of wall 17. This also helps align and position the tank in its proper position when it is inserted within the dispensing apparatus. The inner surface 29 of the recessed portion 28 is on the inside of wall 17. An opening through the recessed portion 28 receives a second detector means 30 which is sealingly mounted in the opening flush with the inner surface 29.

Figure 2:
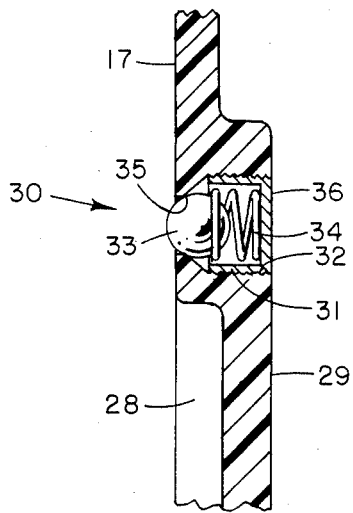
FIG. 2 is a partial cross-sectional view showing the detector means mounted within the tank.
Figure 3:
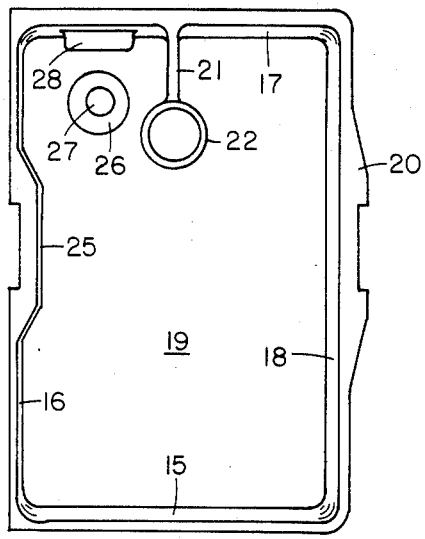
FIG. 3 is a plan view of the tank.

The detector means 27 and 30 are identical so reference is made to FIG. 2 which shows the second detector means 30. The second detector means 30 includes a housing 31 which is tightly and sealingly fitted through an opening 32 through the recessed portion 28 and flush with inner surface 29. Within the housing 31 there is mounted a ball member 33 which engages a mating conductor member on the dispensing apparatus. A spring 34 is provided to bias the ball 33 towards the opening 35 in the housing. The opening 35 is slightly smaller than the ball 33 so that the ball 33 is retained within the housing. The housing 31 and ball 33 are preferably constructed of stainless steel which is resistant to corrosion and which is conductive. The ball 33 may be biased inwardly when it engages a contact on the wall of the dispensing apparatus to insure good contact. As will be apparent, the inner surface 36 of the housing is smooth and is flush with the inside surface 29 of the recessed portion 28. Similarly the first detector means 27 which is identical to second detector means 30 also includes its inner surface flush with the boss 26 so that the inside surface of the tank can be readily cleaned and so that particles will not lodge or hang on the detector means. Stainless steel construction is resistant to corrosion and facilitates cleaning of the detector means along with the inside of the tank 13.

In operation, the tank 13 is inserted within the dispenser apparatus so that the balls on each of the detectors engage contacts on the dispensing apparatus. A current passes between the detectors on the sidewall and on the bottom wall when they are both covered with liquid concentrate. When concentrate no longer covers the detector means in the sidewall, the current does not pass which indicates that the concentrate needs to be added to the tank. The stainless steel balls and stainless steel housings of the detector means facilitate electrical contact with conductors on the dispensing apparatus which receives the concentrate container tank. The circuitry mounted with the dispensing apparatus is known in the art and provides the indication of when the tank is in proper position and when the level falls below the upper detector means.

Although the invention has been described in conjunction with the foregoing specific embodiment, many alternatives, variations and modifications will be apparent to those of ordinary skill in the art. Those alternatives and modifications are intended to fall within the spirit and scope of the appended claims.

I claim:

1. A liquid level detector for a concentrate tank comprising:
    an electrically conductive housing mounted flush with the inside wall of the tank;
    an electrically conductive engaging means mounted within said housing; and
    means biasing said engaging means toward an electrical contact of a liquid concentrate dispensing apparatus when said tank is in communication with said apparatus, said bias means being in electrical connection with said engaging means.

2. The apparatus is set forth in claim 1, wherein:
    said bias means comprises a spring.

3. The apparatus as set forth in claim 1, wherein:
    said engaging means comprises a ball member.

4. A liquid concentrate dispensing apparatus comprising:
    a dispensing means for dispensing liquid concentrate from a removable and refillable concentrate tank;
    said tank comprising liquid level sensor means mounted in the wall of said tank including a detector means communicating with the inside of the tank and extending through the wall to the outside of the tank; and
    said detector means mounted in the wall of said tank further comprising an electricly conductive housing, one wall of said housing communicating with the inside of the tank; said housing of said detector means being disposed relative to the wall of the tank to avoid lodging of particles on the detectors means;
    a biased engaging means connecting said detector means with the dispensing apparatus when said tank is in a preselected position in said dispensing apparatus.

5. A liquid concentrate dispensing apparatus comprising:
    a dispensing means for dispensing liquid concentrate from a removable and refillable concentrate tank;
    said tank comprising liquid level sensor means mounted in the wall of said tank;
    said liquid level sensor means comprising a detector means which further comprises:
        an electrically conductive housing, one wall of said housing being substantially flush with the inside wall of said tank,
        biased engaging means for connecting said detector means with the dispensing apparatus when said tank is in a preselected position in said dispensing apparatus, and
        electrically conductive means biasing said engaging means through the outside wall of said tank.

6. The apparatus of claim 5, wherein the engaging means includes a spring biased detent means to releasably engage the dispensing apparatus.

7. A removable and refillable concentrate tank for a liquid concentrate dispensing apparatus having sidewalls and a bottom wall and further comprising:
    liquid level sensor means including a detector means mounted in the walls of said tank;
    said detector means comprising an electrically conductive housing, one wall of said housing being substantially flush with an inside wall of said tank extending through the wall to the outside of said tank; and
    said detector means having engaging means on the outside of said tank to contact a detector means within the dispensing apparatus when the tank is in a preselected position within the dispensing apparatus.

8. The apparatus as set forth in claim 7 wherein said tank is provided with two of said sensor means, one of said sensor means being located in the sidewalls of said tank, and the other being located in the bottom wall of said tank.

9. The concentrate tank as set forth in claim 7 including electrically conductive means in said housing biasing said engaging means through the outside wall of said tank.

10. The concentrate tank as set forth in claim 9, wherein:
   the engaging means includes a spring bias detent means to releasably engage said detector means from the detector means within the dispensing apparatus.

* * * * *